March 30, 1965 L. PÉRAS 3,175,412
SYNCHROMESHING DEVICES
Filed Jan. 10, 1961 2 Sheets-Sheet 1

INVENTOR
Lucien Peras

BY *Stevens, Davis, Miller & Mosher*
ATTORNEYS

March 30, 1965  L. PÉRAS  3,175,412
SYNCHROMESHING DEVICES
Filed Jan. 10, 1961  2 Sheets-Sheet 2

INVENTOR
Lucien Peras

BY
Stevens, Davis, Miller & Mosher
ATTORNEYS

United States Patent Office 3,175,412
Patented Mar. 30, 1965

3,175,412
SYNCHROMESHING DEVICES
Lucien Péras, Billancourt, France, assignor to Regie Nationale des Usines Renault, Billancourt, France
Filed Jan. 10, 1961, Ser. No. 81,877
Claims priority, application France, Jan. 14, 1960, 815,691, Patent 77,313
4 Claims. (Cl. 74—339)

This invention relates to synchromesh devices for gearboxes or the like transmission mechanisms of the type comprising a movable synchronizing cone integral between a sliding member or clutch and each pinion with which the sliding member is adapted to be engaged through dogs.

In our U. S. Patent 3,035,674 and our co-pending British patent application No. 34,137/59 there is described and claimed a synchromesh device of the above type wherein each movable synchronizing cone comprises a tapered friction surface adapted to co-act with a corresponding surface formed on the sliding member, said cone being furthermore disposed around the dogs of the relevant pinion and locked against rotation relative to said pinion through inner radial lugs normally locked at the entrance of wider axial notches formed on the dog-carrying hub of the pinion, said lugs being formed with inner extensions oblique to the axis of the unit and directed toward the hub of the sliding member, said sliding member hub having formed therein an annular groove, the bottom of which is normally faced but non-engaged by said extensions under the control of a circular spring constantly urging said cone to its inoperative free position, said spring being mounted in a prestressed condition between said pinion and said oblique extensions of said lugs. In a preferred embodiment, the lugs of each synchronizing cone have their lateral edges bevelled on the side registering with the corresponding pinion, and the axial notches formed in the dog-carrying hub of the pinion to receive the lugs have their side edges bevelled accordingly to constitute what are herein referred to as "preventer ramps." As further described in our said patent application, engagement between the bevelled edges of the cone lugs and the corresponding surfaces or preventer ramps of the pinion prevents any movement of translation when the sliding member is actuated, until this locking action is removed when the speeds of the dogs to be brought into meshing engagement becomes equal.

It is known that, in different cases, for example, in gearboxes or transmission mechanisms of trucks or other heavy vehicles and in the lowest speeds it is preferable to use a large-capacity synchronizer.

The device described in our aforesaid co-pending patent application constitutes a satisfactory solution to said problem due to the maximum dimension of the friction cone in the over-all dimensions available between the shafts.

However, in certain cases it may become necessary, notably in gearboxes transmitting very high torques and with a view to avoiding the use of servo means for controlling the speed changes, to further increase the efficiency of this synchronizer.

To this end, the present invention provides an improvement in or modification of the above-described preferred embodiment of the synchromesh device described and claimed in our abovementioned co-pending patent application No. 34,137/59, wherein a second synchronizing cone or synchronizing ring adapted to rotate with the said synchronizing cone is located generally within the annular groove of the sliding member hub between the said hub and the main synchronizing cone, the second synchronizing cone having a tapered friction surface adapted to co-act with a corresponding surface of the sliding member hub and the action of the circular spring on the main synchronizing cone being modified so that the main synchronizing cone is biased to a rest position in which it bears neither against the said hub nor against the second synchronizing cone, the arrangement being such that engagement between the bevelled edges of the lugs on the main synchronizing cone and the corresponding bevelled edges or preventer ramps in the notches of the pinion prior to full synchronization gives rise to a reaction force from the preventer ramps causing the main synchronizing cone to engage the second synchronizing cone and urge the tapered friction surface of the second synchronizing cone against the corresponding surface of the sliding member hub to increase the speed of synchronization.

This arrangement will not interfere with the efficiency of the main cone supporting the whole of the change-speed effort applied by the driver.

The inertia of the members to be synchronized, whether in positive or in negative acceleration, requires or delivers an effort which is utilized for applying the second cone on its bearing surface through the medium of the first cone and of its bevelled lugs.

In this modified arrangement the reaction of the bevelled lugs of the main cone produces a force greater (and of opposite direction) than the change-speed effort, at the expenses of the energy of the moving parts.

The secondary cone is applied against the tapered surface of the hub sliding member by a resultant force inducing in turn, through the frictional engagement of the tapered surfaces, an additional self-locking reaction through the bevelled lugs of the main cone to which it is connected.

When full synchronization is obtained, the additional energy delivered by the component elements of which the speed has varied is zero and as the change-speed effort has only very small frictional or inertia forces to overcome, the dogs may then be engaged without difficulty.

Moreover, unlike the majority of existing synchromesh devices, with the device of this invention the synchronizing operation is effected by applying a thrust directly to the cone, and to the preventer ramps.

However, the reaction from these ramps is always utilized to improve the synchronization.

The subject-matter of this invention will now be described with reference by way of example in the attached drawing wherein.

Figure 1:
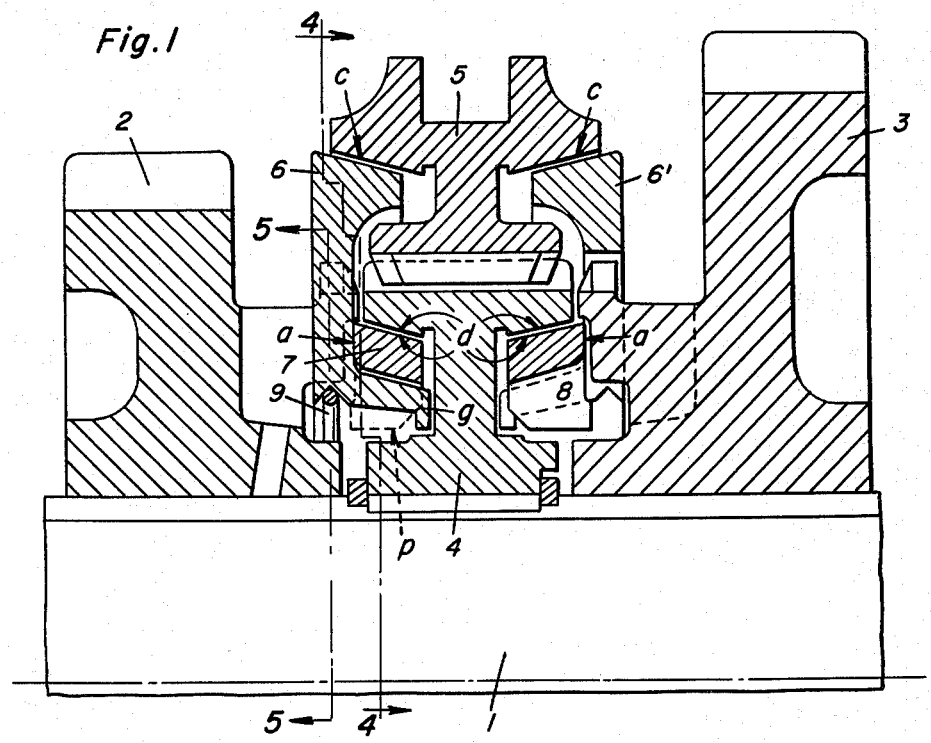
FIGURE 1 is a fragmentary axial section showing the arrangement of this invention.

As shown in the drawing, the second synchronizing cones or rings 7 and 8 are formed with notches $b$ receiving the lugs $g$ of the main synchronizing cones or rings 6 and 6'.

Thus, the rings 7 and 8 are rotatably fast with the existing rings 6 and 6'.

In the lateral direction the movement of the main rings 7 and 8 is limited:

(1) In the direction of the axis of hub 4, by the tapered surfaces $d$;

(2) In the direction of the free-rotating pinion, by its thrust faces $a$ contacting the rings 6 and 6'.

The ring 6' (see FIGURE 2) comprises under each lug a ramp broken by a notch $m$ engageable by the spring 9. So is it with the ring 6'.

Figure 5:
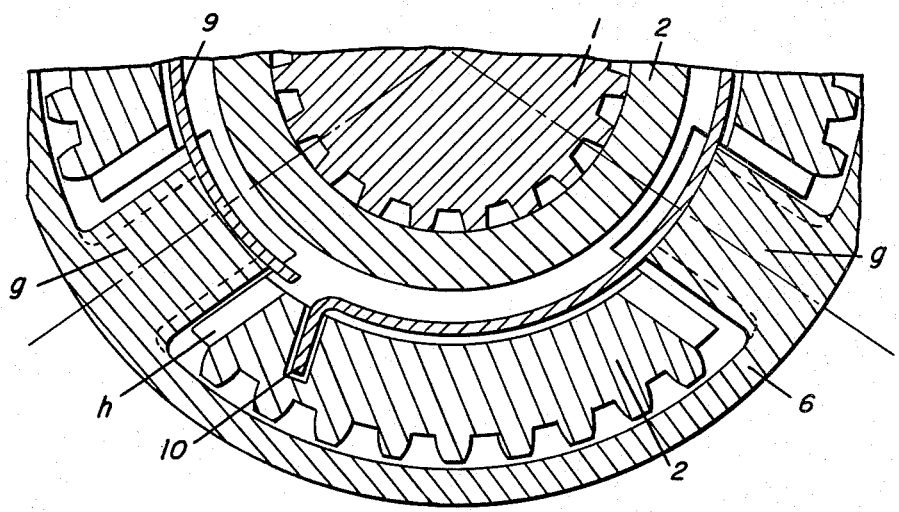

This spring 9 is held laterally and against rotation in the free pinion by having one end bent and engaged into a hole 10 (see FIGURE 5).

By way of example, attention can be paid especially to the left side of figures, which is concerned with the rings 6 and 7 and with the free pinion 2.

Thus, in the inoperative position, the ring 6 has a well-defined position and will bear neither against the hub 4 nor against the ring 7.

Figure 2:
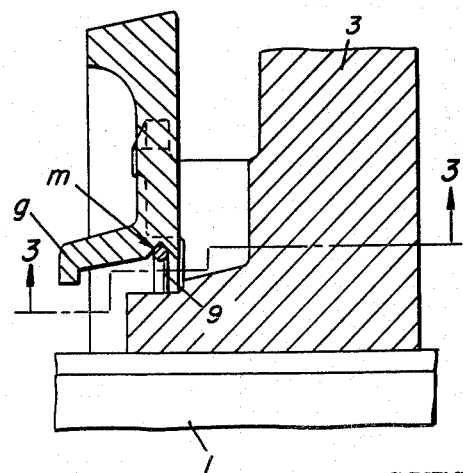
FIGURE 2 is a fragmentary view of FIGURE 1.
Figure 4:
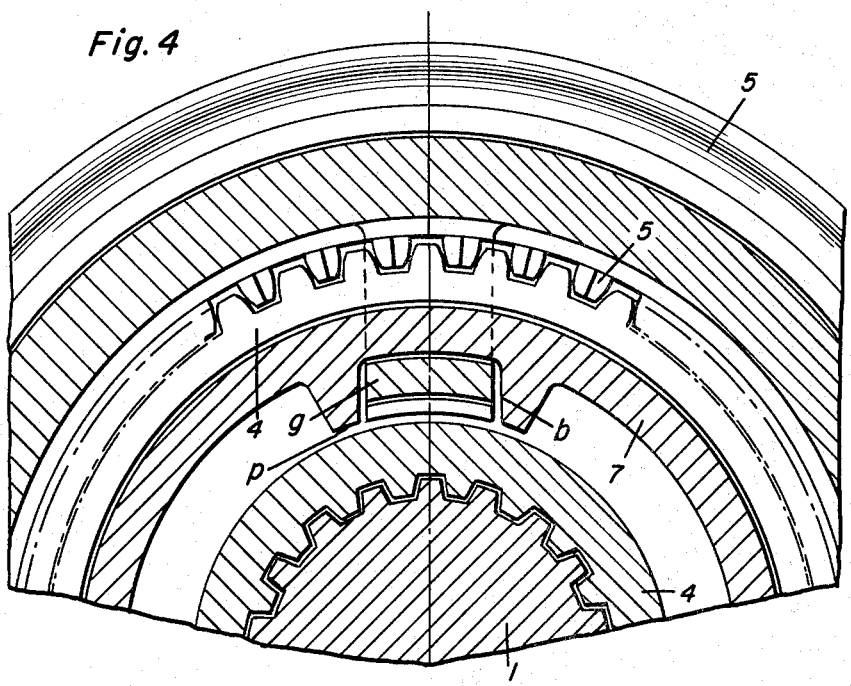
FIGURES 4 and 5 are fragmentary cross-sections of the device which are taken respectively upon the lines IV—IV and V—V of FIGURE 1.

The latter has a limited freedom to move rotatably by loose straddling of its notches $b$ over the lugs $g$ of the ring 6, and to move axially between said ring 6 and the cone $d$ (FIGURES 1 and 4). It is, moreover, loosely centered on the hub 4 by its inner projections $p$ (FIGURES 2 and 4).

Figure 3:
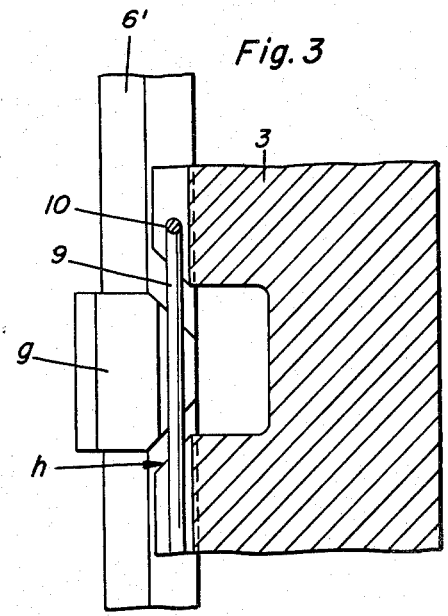
FIGURE 3 is a section view which is taken upon the line III—III of FIGURE 2.

This device operates as follows:

When the conical surface $c$ of the sliding member or clutch 5 contacts the corresponding conical surface of the ring 6, the resistance to elastic deformation of the spring 9 engaging the groove $m$ causes the conical surfaces of the involved elements to adhere strongly to each other and the lugs $g$ of the ring 6 to engage the locking ramps $h$ (FIGURES 1, 3 and 5). Spring 9 is torsionally deformed by the lateral movement of ring 6 and will tend to urge the ring back towards its initial position.

The reaction of ramps $h$ counteracts the change-speed effort as long as the free-rotating pinion and the shaft 1 are not synchronized to each other. During this synchronization that portion of the reaction force which exceeds the change-speed effort is supported by the ring 6 moving axially in a direction opposite to that of the change-speed movement. During this movement, the ring 6 engages the second cone 7 so as to push same against the friction cone $d$. The greater the effort extended by the driver on the sliding clutch 5, the greater the reaction on the cone 7 and the faster the synchronization.

Upon completion of the synchronizing movement, the cone 6 moves towards the free-rotating pinion and frees the cone 7 laterally. The ring 6 is urged laterally back towards its initial position by the previously torsionally deformed spring 9.

Thus, when the dogs are brought into meshing engagement, the release of the cone 7 as a consequence of the reaction of ring 6 in notches $b$ is not interfered with.

Upon completion of the speed-change movement, the cone 7 remains laterally free between the registering face of the free-rotating pinion and the cone $d$ of the synchromesh hub.

By properly arranging, dimensioning and proportioning the ramps $h$ and the other components shown in FIGURE 1, it is possible to adjust to the desired value the reaction of cone 6 on cone 7 during the synchronization and to obtain the maximum efficiency of the sets of two cones for a given effort exerted by the driver on the speed-change control member.

Although the present invention has been described in conjunction with a preferred embodiment, it is to be understood that modifications and variations may be resorted to without departing from the scope of the invention, as those skilled in the art will readily understand. Such modifications and variations are considered to be within the purview and scope of the invention as defined in the appended claims.

I claim:

1. In a gearbox, a shaft, a synchronizer hub secured to said shaft for rotation therewith, a pinion adjacent to at least one side of said synchronizer hub and being freely rotatable on said shaft, a sliding clutch carried by said synchronizer hub in interlocked relation for rotation therewith and for sliding movement longitudinally of said shaft, co-operating dogs on said pinion and said clutch for interconnecting said pinion and said clutch to drive said pinion, said clutch having an inner cone surface tapering towards the center of said clutch and being concentric with said shaft, a movable synchronizing ring interposed between said clutch and said pinion, said movable synchronizing ring having an outer cone surface for mating with said clutch cone surface, means interlocking said movable synchronizing ring with said pinion for momentarily driving said pinion, and means including reaction surfaces urging said movable synchronizing ring in a direction opposite to the direction of clutch movement upon the engagement of said cone surfaces to drive said pinion through said movable synchronizing ring, an auxiliary synchronizing ring loosely carried by said movable synchronizing ring and interlocked therewith for rotation therewith, said auxiliary synchronizing ring having an outer cone surface, and said hub having an inwardly facing cone surface for driving engagement with said auxiliary synchronizing ring to supplement the driving connection between said clutch and said movable synchronizing ring.

2. A gearbox according to claim 1, wherein the means interlocking said pinion and said movable synchronizing ring is a resilient member for returning said movable synchronizing ring to an initial position after clutch disengagement.

3. A gearbox according to claim 2, wherein said resilient member is in the form of a generally circular spring wire having one end anchored to said pinion and being received in an internal notch in said movable synchronizing ring.

4. A gearbox according to claim 1 wherein a pinion is adjacent to each side of said hub with said hub and said clutch being symmetrical above a center plane normal to said shaft, and each pinion has associated therewith one of said movable synchronizing rings and one of said auxiliary synchronizing rings, whereby when said clutch is moved in one axial direction one pinion is engaged and when said clutch is moved in the opposite axial direction the other pinion is engaged.

References Cited by the Examiner

UNITED STATES PATENTS

| | | | |
|---|---|---|---|
| 2,835,143 | 5/58 | Kelbel | 192—53.2 |
| 2,907,428 | 10/59 | Erwin et al. | 192—53.2 |
| 2,908,366 | 10/59 | Altmann | 74—339 |
| 2,942,712 | 6/60 | Altmann | 74—339 |

DON A. WAITE, *Primary Examiner.*